United States Patent
Ishiguro et al.

(10) Patent No.: US 10,507,785 B2
(45) Date of Patent: Dec. 17, 2019

(54) AIRBAG

(71) Applicant: TOYODA GOSEI CO., LTD., Kiyosu-shi, Aichi-ken (JP)

(72) Inventors: Naohiko Ishiguro, Kiyosu (JP); Wataru Miura, Kiyosu (JP); Ryotaro Ishida, Kiyosu (JP); Hiroyuki Nakanishi, Kiyosu (JP); Masami Shibata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 14 days.

(21) Appl. No.: 16/033,297

(22) Filed: Jul. 12, 2018

(65) Prior Publication Data

US 2019/0061674 A1 Feb. 28, 2019

(30) Foreign Application Priority Data

Aug. 25, 2017 (JP) ................. 2017-162306

(51) Int. Cl.
| | |
|---|---|
| *B60R 21/2338* | (2011.01) |
| *B60R 21/203* | (2006.01) |
| *B60R 21/26* | (2011.01) |
| *B60R 21/237* | (2006.01) |

(52) U.S. Cl.
CPC ........ *B60R 21/2338* (2013.01); *B60R 21/203* (2013.01); *B60R 21/237* (2013.01); *B60R 21/26* (2013.01); *B60R 2021/23382* (2013.01)

(58) Field of Classification Search
CPC ... B60R 21/26; B60R 21/2338; B60R 21/203; B60R 2021/23386
See application file for complete search history.

(56) References Cited

U.S. PATENT DOCUMENTS

| | | | | |
|---|---|---|---|---|
| 3,752,501 | A * | 8/1973 | Daniel ................. | B60R 21/233 280/729 |
| 5,529,337 | A * | 6/1996 | Takeda ................. | B60R 21/233 280/729 |
| 8,764,053 | B1 * | 7/2014 | Dix ....................... | B60R 21/203 280/729 |
| 8,876,153 | B2 * | 11/2014 | Dix ....................... | B60R 21/233 280/729 |
| 9,758,121 | B2 * | 9/2017 | Paxton ................. | B60R 21/205 |
| 10,131,311 | B2 * | 11/2018 | Ohno .................... | B60R 21/231 |
| 2018/0215339 | A1 * | 8/2018 | Nakanishi ............. | B62D 1/04 |
| 2018/0290616 | A1 * | 10/2018 | Nakajima ............. | B60R 21/203 |
| 2018/0354447 | A1 * | 12/2018 | Nakajima ............. | B60R 21/231 |
| 2019/0193671 | A1 * | 6/2019 | Hotta ................... | B60R 21/233 |

FOREIGN PATENT DOCUMENTS

| | | |
|---|---|---|
| EP | 2033850 A2 | 3/2009 |
| JP | 2009-061970 A | 3/2009 |

* cited by examiner

*Primary Examiner* — Faye M Fleming
(74) *Attorney, Agent, or Firm* — Posz Law Group, PLC

(57) ABSTRACT

An airbag includes: a bag body forming the outer peripheral wall; and a regulating member disposed on an outer peripheral side of the bag body at a time of inflation completion of the bag body. The regulating member is configured so as to be able to regulate the bag body so that an area ranging from the vicinity of a joint portion for mutually joining the outer peripheral edge of the vehicle body side panel and the outer peripheral edge of the occupant side panel to a side of the gas inflow port at the time of inflation completion of the airbag is made smaller in external dimensions and reduced in size than an area at a time of free inflation state of the bag body.

5 Claims, 7 Drawing Sheets

AIRBAG

CROSS-REFERENCE TO RELATED APPLICATION(S)

This application is based upon and claims the benefit of priority from prior Japanese patent application No. 2017-162306, filed on Aug. 25, 2017, the entire contents of which are incorporated herein by reference.

BACKGROUND

The present invention relates to an airbag having a vehicle body side panel that is disposed on the side of a vehicle body side and an occupant side panel that is disposed on the side of an occupant at the time of inflation completion, the airbag configured such that the outer peripheral edges of the vehicle body side panel and the occupant side panel are mutually joined and formed into a bag shape, inflation gas made to flow into the airbag from a gas inflow port formed in the vehicle body side panel so as to be able to inflate the airbag, the airbag folded and stored in a storage portion, and the periphery of the gas inflow port installed on the side the storage portion.

As an airbag having this kind of configuration and for use in a steering wheel has been available that is configured such that a crossed belt-shaped regulating member is disposed in an area (an area above a gas inflow port at the time of inflation completion) in the vicinity of a gas inflow port inside the airbag while the four end portions of the regulating member are respectively joined to the side of a vehicle body side panel (for example, refer to JP-A-2009-61970). In this related-art airbag, the external shape of the airbag at the time of inflation completion is regulated by connecting the end portions of the regulating member disposed inside the airbag so as to pull the area of the vehicle body side panel in the vicinity of the gas inflow port inward.

However, in the related-art airbag, since the regulating member is configured so as to be disposed in the vicinity of the gas inflow port inside the airbag, the inflation gas discharged from an inflator is affected by the regulating member so that the inflation gas flows into the airbag in some cases, thereby having a fear of causing a problem in attaining smooth and quick inflation of the airbag.

SUMMARY

The present invention is intended to provide an airbag which is capable of being inflated smoothly and quickly and the completely inflated shape of which can be regulated accurately by a regulating member.

According to an aspect of the invention, there is provided an airbag including a vehicle body side panel that is disposed on a side of a vehicle body and an occupant side panel that is disposed on a side of an occupant at a time of inflation completion, the airbag configured such that an outer peripheral wall is formed by mutually joining an outer peripheral edge of the vehicle body side panel and an outer peripheral edge of the occupant side panel, inflation gas made to flow into the airbag from a gas inflow port formed in the vehicle body side panel so as to be able to inflate the airbag, the airbag folded and stored in a storage portion, a periphery of the gas inflow port installed on a side of the storage portion, the airbag comprising: a bag body forming the outer peripheral wall; and a regulating member disposed on an outer peripheral side of the bag body at a time of inflation completion of the bag body, wherein the regulating member is configured so as to be able to regulate the bag body so that an area ranging from the vicinity of a joint portion for mutually joining the outer peripheral edge of the vehicle body side panel and the outer peripheral edge of the occupant side panel to a side of the gas inflow port at the time of inflation completion of the airbag is made smaller in external dimensions and reduced in size than an area at a time of free inflation state of the bag body.

DETAILED DESCRIPTION OF EXEMPLARY EMBODIMENTS

Figure 1:
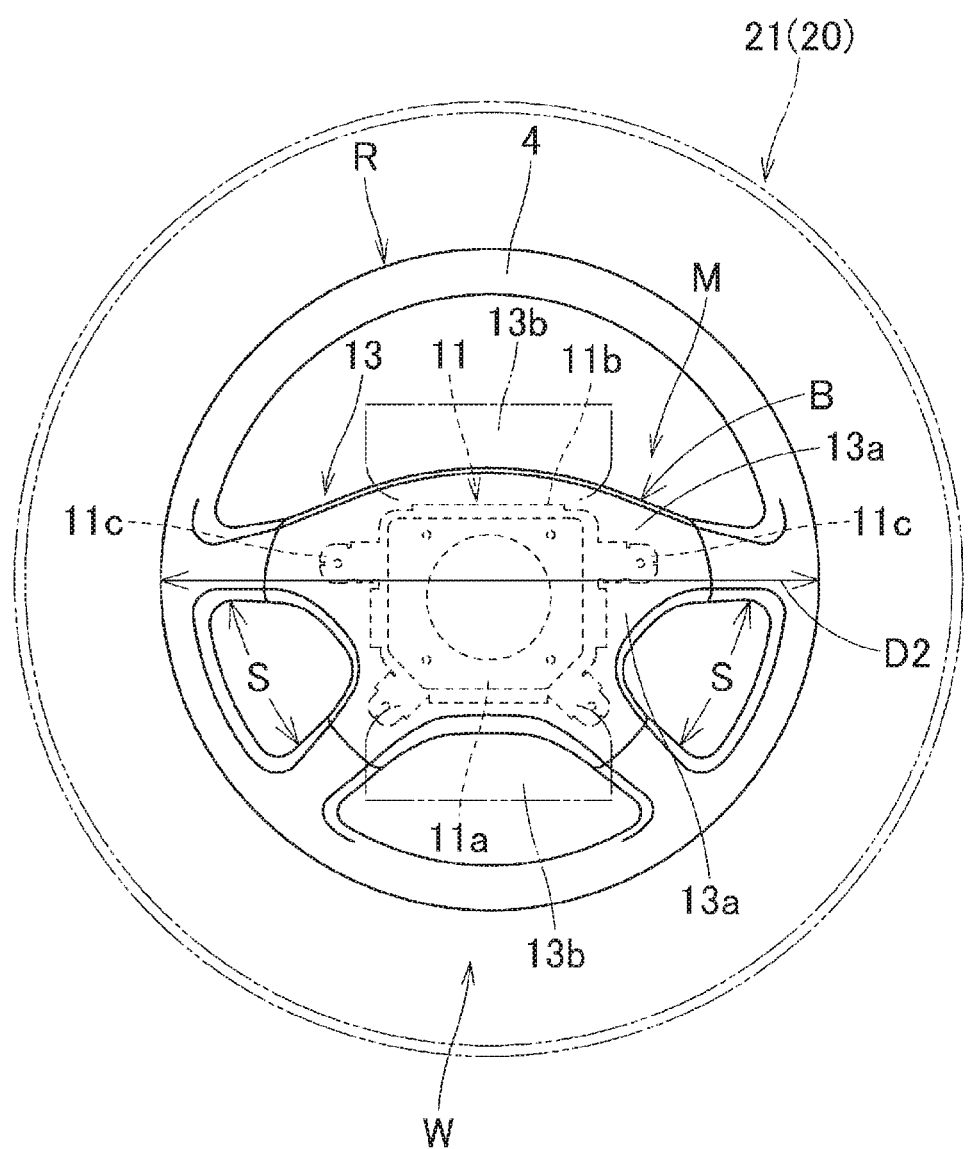
FIG. 1 is a schematic plan view showing an airbag apparatus for a driver's seat in which an airbag according to an embodiment of the present invention is used.
Figure 2:
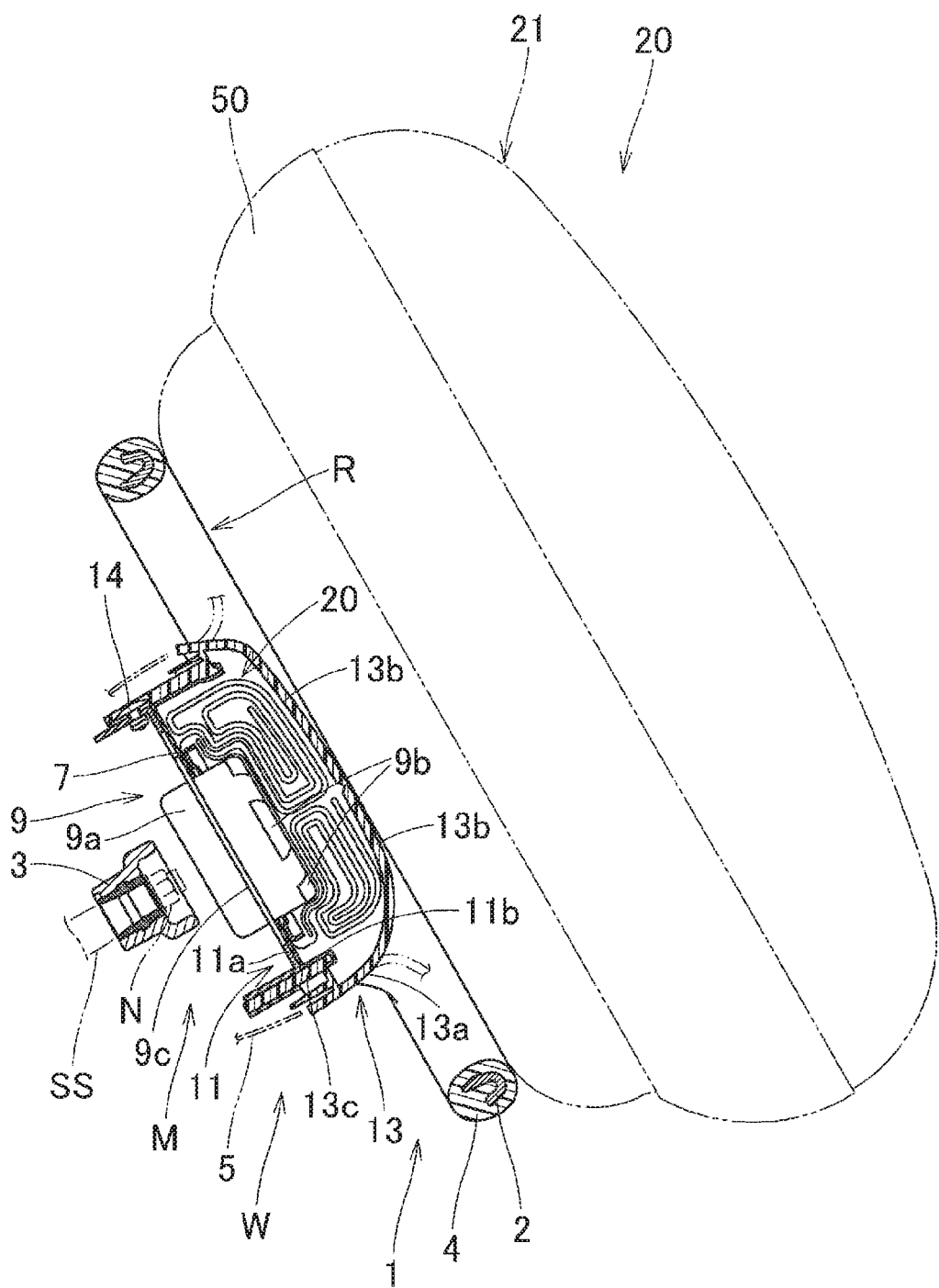
FIG. 2 is a schematic vertical sectional view showing the airbag apparatus for the driver's seat shown in FIG. 1 at the time when the airbag is mounted in a vehicle.

An embodiment according to the present invention will be described below on the basis of the accompanying drawings. In this embodiment, an airbag 20 for use in an airbag apparatus M for a driver's seat to be mounted on a steering wheel W is taken as an example of an airbag and described in detail. As shown in FIGS. 1 and 2, the steering wheel W is composed of a steering wheel body 1 and the airbag apparatus M disposed on the upper portion of the boss section B at the center of the steering wheel body 1. The steering wheel body 1 is composed of a circular annular ring section R that is gripped at the time of steering, the boss section B disposed nearly at the center of the ring section R and secured to a steering shaft SS, and a plurality (four in the case of the embodiment) of spoke sections S for connecting the boss section B to the ring section R.

In this specification, the front-rear, up-down and left-right directions are determined as described below unless otherwise specified, on the basis of the straight run steering of the steering wheel W mounted in a vehicle, the direction along the shaft direction of the steering shaft SS is set to the up-down direction, the direction nearly along the front-rear direction of the vehicle and orthogonal to the axial direction of the steering shaft SS is set to the front-rear direction, and the direction nearly along the left-right direction of the vehicle and orthogonal to the axial direction of the steering shaft SS is set to the left-right direction.

As shown in FIGS. 1 and 2, the steering wheel body 1 is equipped with a core metal 2 made of a metal such as an aluminum alloy and a coating layer 4 made of a synthetic resin and covering the circumference of the core metal 2. The core metal 2 is disposed to connect the ring section R, the boss section B and the spoke sections S. The coating layer 4 is provided on the core metal 2 at the portion of the ring section R and at the portions of the respective spoke sections S on the side of the ring section R. A boss 3, which is made of steel and in which the steering shaft SS is inserted and secured with a nut N, is provided at the portion of the boss section B in the core metal 2. Furthermore, a lower cover 5 made of a synthetic resin and covering the lower portion of the boss section B is provided at the lower section of the steering wheel body 1.

As shown in FIG. 2, the airbag apparatus M is composed of the airbag 20 that is folded and stored in a case 11, an inflator 9 for supplying inflation gas to the airbag 20, an airbag cover 13 for covering the upper portion of the airbag 20, the case 11 serving as a storage portion for storing and holding the airbag 20 and the inflator 9 and for holding the airbag cover 13, and a retainer 7 for installing the airbag 20 in the case 11 together with the inflator 9.

The retainer 7 made of sheet metal and formed into a substantially rectangular annular shape is used to install the airbag 20 in the case 11 by pressing the peripheral edge 24 of a gas inflow port 23, described later, in the airbag 20 and is equipped, at four corners, with bolts, not shown, that are fastened to the case 11 with nuts so as to install the inflator 9 in the case 11.

The inflator 9 is equipped with a cylindrical body section 9a having a plurality of gas discharge ports 9b in its upper section and a flange section 9c protruding from the outer peripheral face of the body section 9a. Through holes, not shown, are formed in the flange section 9c to allow the respective bolts, not shown, of the retainer 7 to pass through.

The case 11, made of sheet metal, is formed into a substantially rectangular parallelepiped shape opening upward and is disposed on the upper portion of the boss section B of the steering wheel W, thereby constituting the storage portion for storing the folded airbag 20 as shown in FIG. 2. The case 11 has a substantially rectangular bottom wall section 11a in which the body section 9a of the inflator 9 is inserted from below and installed and a peripheral wall section 11b extending upward and downward from the outer peripheral edge of the bottom wall section 11a. At the upper end of the peripheral wall section 11b, installation pieces 11c extending outward are formed (see FIG. 1), and a horn switch mechanism installation board, not shown, is installed on these installation pieces 11c. Furthermore, the case 11 is installed and fixed to the core metal 2 of the steering wheel W by using this installation board, not shown, whereby the airbag apparatus M is mounted on the upper portion of the boss section B of the steering wheel body 1 that has already been mounted on the steering shaft SS. Moreover, the side wall section 13c of the airbag cover 13 is installed on the peripheral wall section 11b of the case 11 by using, for example, rivets 14 (see FIG. 2). In the case of this embodiment, the airbag 20 and the inflator 9 are installed on the bottom wall section 11a of the case 11 by using the bolts, not shown, of the retainer 7 disposed inside the airbag 20 as fastening means, that is to say, by passing the bolts, not shown, through the installation holes 25 formed in the peripheral edge 24 of the gas inflow port 23 in the airbag 20, the bottom wall section 11a of the case 11 and the flange section 9c of inflator 9 and then by fastening the bolts with nuts, not shown.

The airbag cover 13 is made of a synthetic resin and has a ceiling wall section 13a covering the upper portion of the airbag 20 stored in the case 11 and the side wall section 13c having a substantially rectangular cylindrical shape and extending downward from the vicinity of the outer peripheral edge of the ceiling wall section 13a. On the ceiling wall section 13a, two door sections 13b and 13b are formed so as to open on both sides in the front-rear direction when pushed by the inflating airbag 20.

Figure 3:
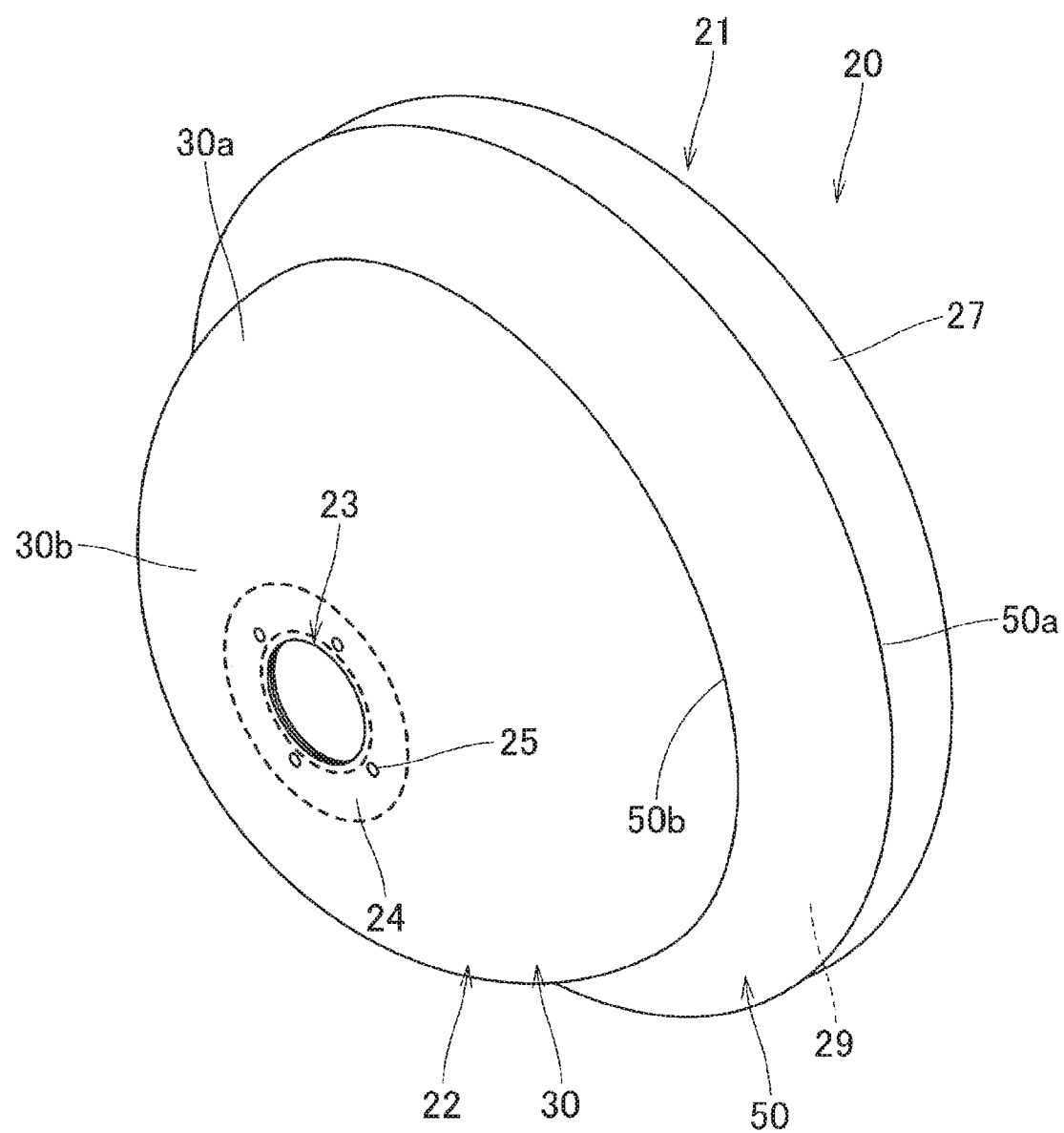
FIG. 3 is a perspective view showing the airbag for use in the airbag apparatus for the driver's seat shown in FIG. 1, in which the airbag being inflated solely is viewed from the side of the vehicle body side panel.
Figure 4:
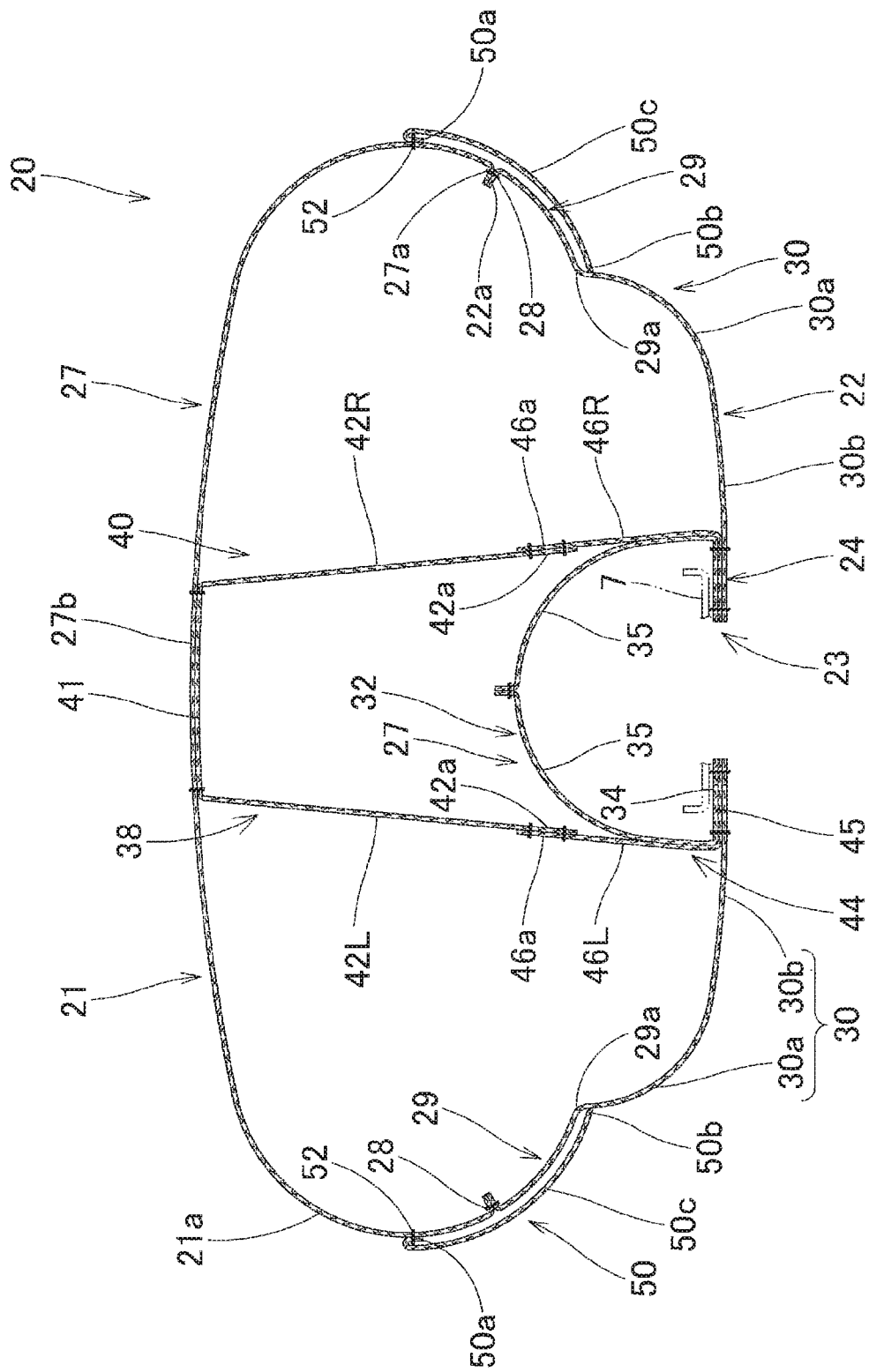
FIG. 4 is a sectional view showing the airbag shown in FIG. 3.

As shown in FIGS. 3 and 4, the airbag 20 has a bag-shaped bag body 21, a rectifying cloth 32 disposed inside the bag body 21, a tether 38 disposed inside the bag body 21 and a regulating panel 50 serving as a regulating member disposed on the outer peripheral side of the bag body 21.

Figure 5:
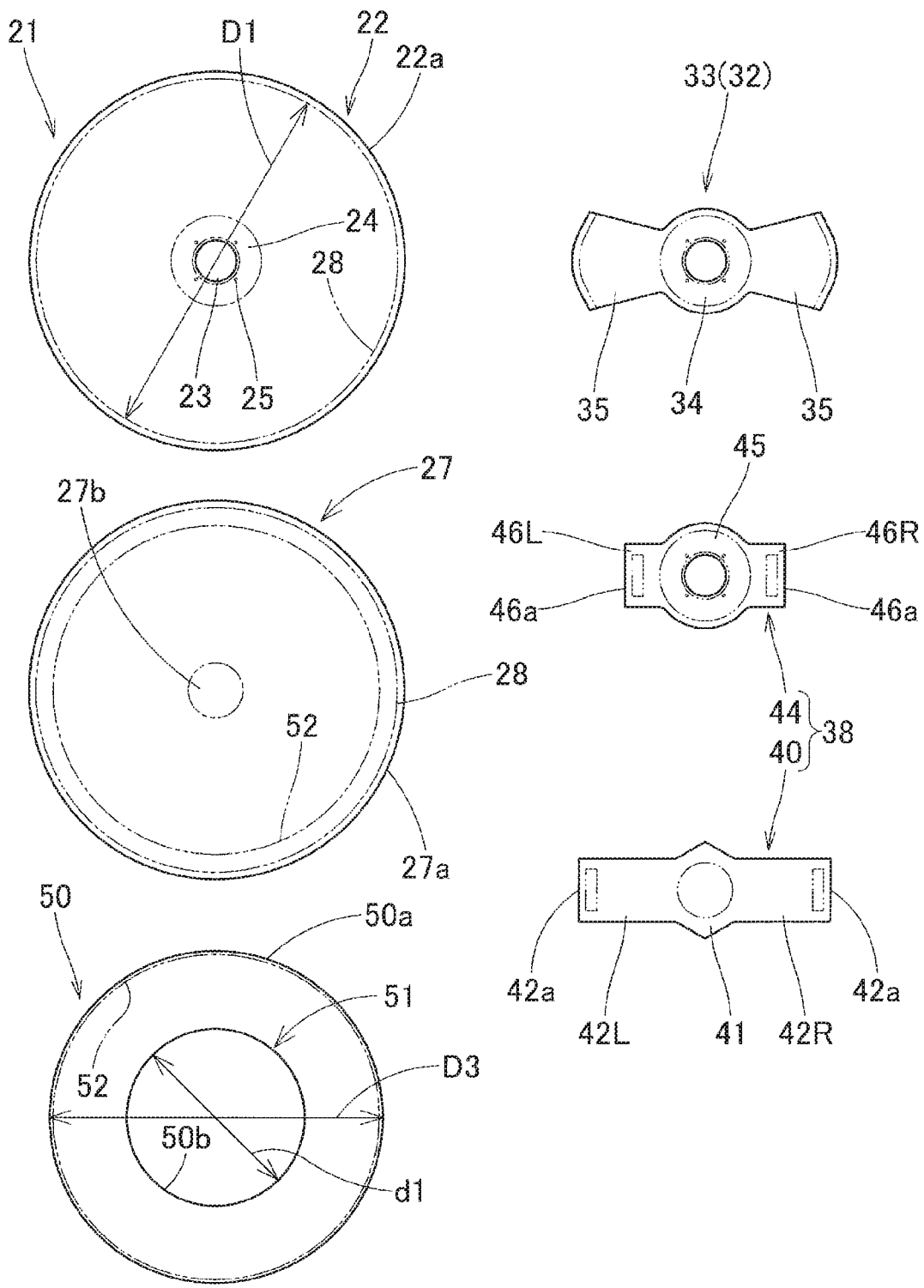
FIG. 5 is a plan view showing base cloths constituting the airbag shown in FIG. 3.

The bag body 21 has a vehicle body side panel 22 that is disposed on the side of a vehicle body (on the side of the steering wheel W) and an occupant side panel 27 that is disposed on the side of an occupant at the time of inflation completion, the external shape of each panel being substantially circular, and the bag body 21 is formed into a bag shape by mutually joining the outer peripheral edges 22a and 27a of the vehicle body side panel 22 and the occupant side panel 27 (see FIGS. 4 and 5). In other words, in the airbag 20, the bag body 21 is composed of an outer peripheral wall 21a that is formed by mutually joining the outer peripheral edges 22a and 27a of the vehicle body side panel 22 and the occupant side panel 27. The gas inflow port 23 for allowing inflation gas to flow into the bag body 21 is open in a circular shape nearly at the center of the vehicle body side panel 22 as shown in FIGS. 3 and 5. In the peripheral edge 24 of the gas inflow port 23, the installation holes 25, four in number, for installing the airbag 20 (the bag body 21) in the case 11 are formed in the peripheral edge 24 of the gas inflow port 23. The central area of the occupant side panel 27 constitutes a planned occupant-receiving section 27b that receives an occupant at the time of inflation completion. What's more, the bag body 21 is configured so that the peripheral edge 24 of the gas inflow port 23 is installed on the case 11 (the bottom wall section 11a of the case 11) by using the retainer 7. The bag body 21 is configured so as to be formed into a bag shape by mutually sewing (joining) the outer peripheral edges 22a and 27a of the vehicle body side panel 22 and the occupant side panel 27 and so as to be mounted on the steering wheel W in the state in which the bag body 21 is reversed so that the joint portion 28 for mutually joining (sewing) the outer peripheral edges 22a and 27a is not exposed to the outer peripheral side. Still further, in this embodiment, the outside diameter D1 (see FIG. 5) of the bag body 21 in the flatly developed state of the bag body 21 is set larger than the ring diameter D2 (see FIG. 1) of the ring section R of the steering wheel W. More specifically, the outside diameter D1 of the bag body 21 in the flatly developed state is set to appropriately ⅝ of the ring diameter D2 of the ring section R.

Figure 7:
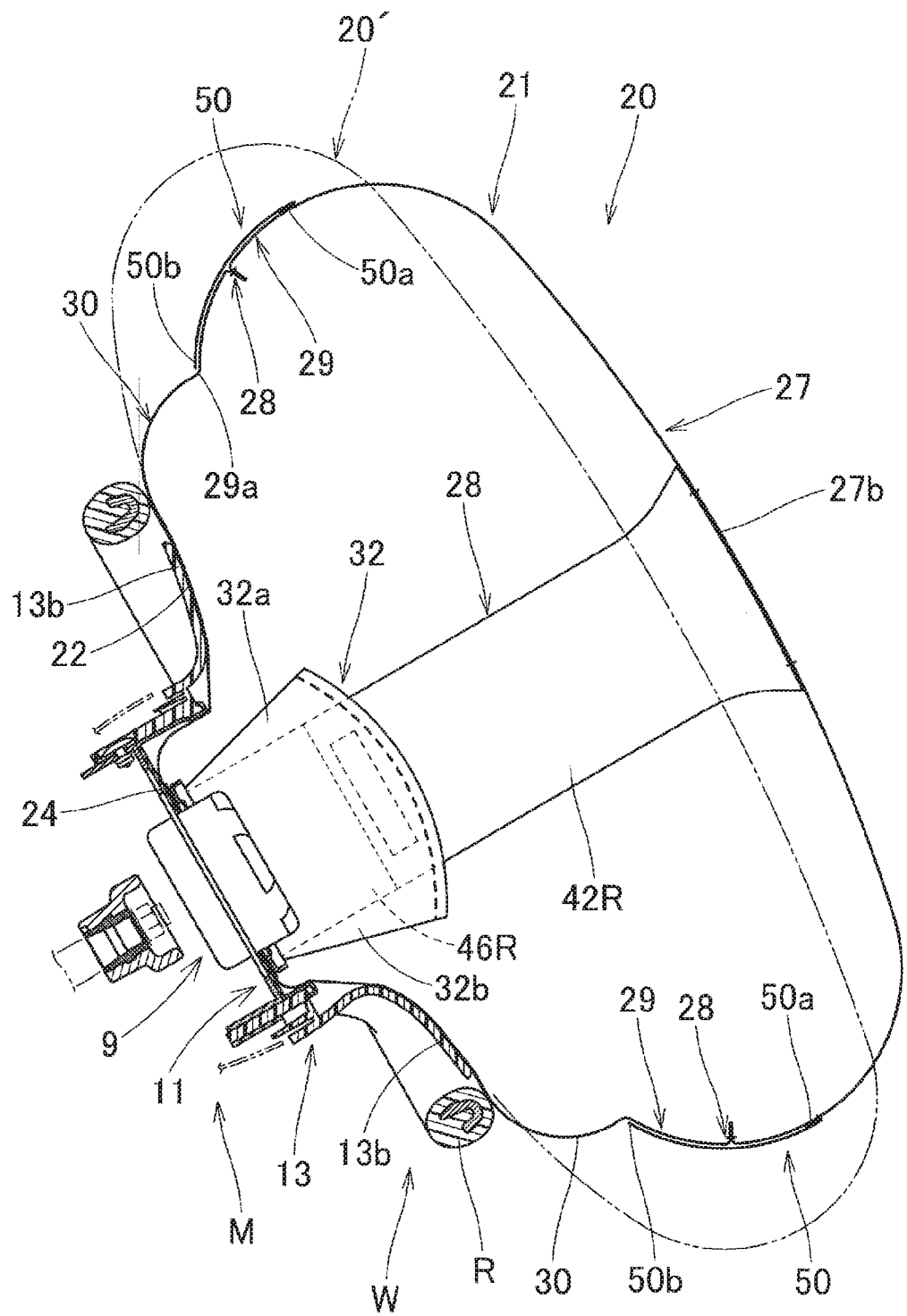
FIG. 7 is a schematic vertical sectional view showing the state in which the inflation of the airbag is completed in the airbag apparatus for the driver's seat according to this embodiment.

The rectifying cloth 32 disposed inside the bag body 21 is configured so as to cover the upper area of the gas inflow port 23 and so as to be formed into a substantially cylindrical shape and provided with openings 32a and 32b on both end sides in the front-rear direction so that the inflation gas G having entered from the gas inflow port 23 can be rectified to both sides in the front-rear direction (see FIGS. 4 and 7). In the case of this embodiment, the rectifying cloth 32 is made of a rectifying cloth material 33 shown in FIG. 5. The rectifying cloth material 33 has a substantially circular installation section 34 to be installed around the gas inflow port 23 and substantially fan-shaped body sections 35 and 35 that are formed so as to extend from the installation section 34 to both sides in the left-right direction. In the installation section 34, an opening (reference number omitted) is formed so as to correspond to the gas inflow port 23 and the installation holes 25. Furthermore, the rectifying cloth 32 is formed into a substantially cylindrical shape provided with the openings 32a and 32b on both sides in the front-rear direction by mutually joining (sewing) the tip ends of the body sections 35 and 35 in the state in which the installation section 34 is joined (sew to the peripheral edge 24 of the gas inflow port 23.

The tether 38 disposed inside the bag body 21 is provided so as to connect the portion (the portion of the planned occupant-receiving section 27b) in the vicinity of the center of the occupant side panel 27 and the portion of the peripheral edge 24 of the gas inflow port 23 as shown in FIGS. 4 and 7. The tether 38 is used to regulate the separation distance of the occupant side panel 27 from the gas inflow port 23 at the time of inflation completion of the bag body 21, thereby regulating the inflation-completed shape of the bag body 21, in the case of this embodiment, the tether 38 is composed of tether base cloths 40 and 44 disposed on the side of the occupant side panel 27 and on the side of the vehicle body side panel 22, respectively. The tether base cloth 40 provided on the side of the occupant side panel 27 has a connection section 41 that is connected to the portion in the vicinity of the center of the occupant side panel 27 and belt-shaped tether bodies 42L and 42R extending from the left edge side and the right edge side of the connection section 41, respectively, as shown in FIG. 5. The tether base cloth 44 provided on the side of the vehicle body side panel 22 has a substantially circular connection section 45 that is connected to the peripheral edge 24 of the gas inflow port 23 and belt-shaped tether bodies 46L and 46R extending from the left edge side and the right edge side of the connection section 45, respectively, as shown in FIG. 5. An opening (reference number omitted) is formed in the connection section 45 so as to correspond to the gas inflow port 23 and the installation holes 25. The tether 38 is configured by mutually joining (sewing) the tip ends 42a and 46a of the respective tether bodies 42L, 42R, 46L and 46R as shown in FIG. 4, in the case of this embodiment, the tether 38 is configured so that the tether bodies 42L, 42R, 46L and 46R are positioned outward from the rectifying cloth 32 in the left-right direction. Since the tether 38 is provided, the separation distance of the planned occupant-receiving section 27b in the vicinity of the center of the occupant side panel 27 from the gas inflow port 23 is regulated, whereby the planned occupant-receiving section 27b is disposed in a substantially flat shape at the time of inflation completion of the airbag 20 (the bag body 21) (see FIGS. 4 and 7).

The regulating panel 50 serving as a regulating member is made of a flexible sheet and its external shape is circular annular as shown in FIG. 5. The regulating panel 50 is configured to regulate the bag body 21 so that the area ranging from the vicinity of the joint portion 28 for mutually joining the outer peripheral edges 22a and 27a of the vehicle body side panel 22 and the occupant side panel 27 to the side of the gas inflow port 23 at the time of inflation completion of the airbag 20 is made smaller in external dimensions and reduced in size than the area at the time of free inflation state of the bag body 21. More specifically, the regulating panel 50 is formed into a circular annular shape in which the centers of its outer peripheral edge 50a and its inner peripheral edge 50b are aligned so as to be concentric, as shown in FIG. 5, both the outside diameter D3 of the regulating panel 50 and the inside diameter d1 of the opening area 51 of the regulating panel 50 are set smaller than the outside diameter D1 of the bag body 21 in the flatly developed state. In other words, the inner peripheral shape of the regulating panel 50 is set smaller than the joint portion 8 for mutually is joining the outer peripheral edges 22a and 27a of the vehicle body side panel 22 and the occupant side panel 27 in the bag body 21. More specifically, the outside diameter D3 of the regulating panel 50 is set to approximately ⅞ of the outside diameter D1 of the bag body 21 in the flatly developed state, and the inside diameter d1 of the opening area 51 of the regulating panel 50 is set to approximately ½ of the outside diameter D1 of the bag body 21 in the flatly developed state.

In addition, the side of the outer peripheral edge 50a of the regulating panel 50 is directed to the side of the outer peripheral edge 27a of the occupant side panel 27, the side of the inner peripheral edge 50b thereof is directed to the central side of the occupant side panel 27, and the regulating panel 50 is connected to the bag body 21 by joining (sewing) the outer peripheral edge 50a to the occupant side panel 27 while the center of the regulating panel 50 is nearly aligned with the center of the occupant side panel 27. The joint portion 52 for joining the outer peripheral edge 50a of the regulating panel 50 to the occupant side panel 27 is formed over the entire area along the outer peripheral edge 50a. The regulating panel 50 is configured so that the side of the inner peripheral edge 50b is positioned on the side of the vehicle body side panel 22 at the time of inflation completion of the hag body 21 as shown in FIGS. 3 and 4. In the case of this embodiment, at the time of inflation completion of the airbag 20, the regulating panel 50 in the state in which the side of the outer peripheral edge 50a is joined to the occupant side panel 27 is reversed so that the side of the inner peripheral edge 50b is positioned on the side of the vehicle body side panel 22, thereby covering the outer peripheral side of the bag body 21. In the regulating panel 50, the inside diameter d1 of the inner peripheral edge 50b (the opening area 51) is set to approximately ½ of the outside diameter D1 of the bag body 21, and the outside diameter D3 of the outer peripheral edge 50a is set smaller than the outside diameter D1 of the hag body 21. Hence, at the time of inflation completion of the airbag 20, the regulating panel 50 in the state of being reversed so as to cover the outer peripheral side of the joint portion 52 is disposed so as to cover the outer peripheral side ranging from the portion in the vicinity of the outer peripheral edge 27a of the occupant side panel 27 in the bag body 21 beyond the joint portion 28 to part (the area on the side of the outer peripheral edge 22a) of the vehicle body side panel 22. At this time, as shown in FIG. 4, the regulating panel 50 has a cross-sectional shape such that the intermediate portion 50c thereof is protruded downward and curved into a substantially circular arc shape, furthermore, since the inside diameter d1 of the inner peripheral edge 50b is set to approximately ½ of the outside diameter D1 of the bag body 21, the regulating panel 50 has a form in which the vehicle body side panel 22 is constricted significantly so that the area in the vicinity of the outer peripheral edge 22a of the vehicle body side panel is recessed inward at the portion of the inner peripheral edge 50b, whereby the area ranging from the vicinity of the joint portion 28 for mutually joining the outer peripheral edges 22a and 27a to the side of the gas inflow port 23 is made smaller in external dimensions and reduced in size than the area at the time of free inflation state. Moreover, in this embodiment, since the outside diameter D3 of the outer peripheral edge 50a of the regulating panel 50 is set slightly smaller than the outside diameter D1 of the bag body 21, at the time of inflation completion of the bag body 21, the vicinity of the joint portion 28 for mutually joining the outer peripheral edges 22a and 27a of the vehicle body side panel 22 and the occupant side panel 27 is suppressed so as not to protrude outward by the portion on the side of the outer peripheral edge 50a of the regulating panel 50. Hence, in comparison with a case in which the inflation is completed in the state in which the regulating panel is not provided, the bag body 21 is regulated so as to be made slightly smaller in outside diameter but made larger in thickness, whereby the bag body 21 is bulkily inflated such that the planned occupant-receiving section 27b is separated from the gas inflow port 23.

More specifically, at the time of inflation completion, the area ranging from the portion in the vicinity of the outer peripheral edge 27a of the occupant side panel 27 in the bag body 21 beyond the joint portion 28 to part (the area on the side of the outer peripheral edge 22a) of the vehicle body side panel 22 is used as a regulated wall section 29, the outer peripheral side of which is covered with the regulating panel 50 and regulated so as not to protrude outward, and the lower end 29a of this regulated wall section 29 is made contact with the inner peripheral edge 50b of the regulating panel 50, whereby the lower end 29a is constricted so as to be minimized in diameter. What's more, in the vehicle body side panel 22 of the bag body 21 at the time of inflation completion, the area on the side of the gas inflow port 23 constitutes an extended wall section 30 that extends so as to protrude downward from the inner peripheral edge 50b of the regulating panel 50. The extended wall section 30 has a curved portion 30a that is curved on the side of the regulating panel 50 (on the side of the outer peripheral edge 22a of the vehicle body side panel 22) and a flat portion 30b that is formed into a substantially flat shape so as to be continuous from the curved portion 30a on the central side of the vehicle body side panel 22 as shown in FIG. 4. The flat portion 30b is formed by the peripheral edge 24 of the gas inflow port 23 serving as the area on the central side of the vehicle body side panel in this embodiment, at the time of inflation completion of the bag body 21, the flat portion 30b is disposed so as to be nearly parallel with the planned occupant-receiving section 27b of the occupant side panel 27 (see FIG. 4).

In this embodiment, the vehicle body side panel and the occupant side panel 27 both constituting the bag body 21, the rectifying cloth material 33 constituting the rectifying cloth 32, the tether base cloths 40 and 44 constituting the tether 38, and the regulating panel 50 are formed of flexible woven cloths made of polyester yarn, polyamide yarn, etc.

Next, a method for producing the airbag 20 according to this embodiment will be described. First, while the side of the outer peripheral edge 50a is directed to the side of the outer peripheral edge 27a of the occupant side panel 27, the regulating panel 50 is placed on the side of the outer peripheral face of the occupant side panel 27 so that the center of the regulating panel 50 is aligned with the center of the occupant side panel 27, and the outer peripheral edge 50a of the regulating panel 50 is sewn joined) to the occupant side panel 27 using a sewing thread around the entire circumference so as to form the joint portion 52. Furthermore, the connection section 41 of the tether base cloth 40 is sewn (joined) to the side of the inner peripheral face of the occupant side panel 27 using a sewing thread. Moreover, the connection section 45 of the tether base cloth 44 and the installation section 34 of the rectifying cloth material 33 are placed on the side of the inner peripheral face of the vehicle body side panel 22 and sewn using a sewing thread, and the gas inflow port 23 and the installation holes 25 are formed by drilling. After that, the occupant side panel 27 and the vehicle body side panel 22 are stacked while their outer peripheral face sides are opposed to each other so that the outer peripheral edges 22a and 27a are aligned, and the outer peripheral edges 22a and 27a are mutually sewn (joined) using a sewing thread so as to form the joint portion 28, thereby forming the bag body 21 having a bag shape. The bag body 21 is reversed by using the gas inflow port 23 so that the seam allowance of the joint portion 28 is not exposed outside, and then the tip ends 42a and 46a of the tether bodies 42L, 42R, 46L and 46R of the tether base cloths 40 and 44 are mutually sewn using a sewing thread to form the tether 38. The tip ends of the body sections 35 and 35 of the rectifying cloth material 33 are mutually sewn to form the rectifying cloth 32, and the regulating panel 50 is reversed so that the inner peripheral edge 50b is positioned on the side of the vehicle body side panel 22 as showy 6, whereby the airbag 20 can be produced.

Furthermore, after the production of the airbag 20, in the state that bolts, not shown, are protruded from the respective installation holes 25 and the retainer 7 is disposed inside, the airbag 20 is folded so as to be able to be stored inside the case 11 while the reversed state of the regulating panel 50 is maintained, and the airbag 20 is wrapped with a predetermined breakable wrapping material so as not to cause a folding collapse. Next, while the respective bolts, not shown, of the retainer 7 are made to pass through the bottom wall section 11a, the airbag 20 is stored inside the airbag 20, the body section 9a of the inflator 9 is inserted from under the body section 9a, the respective bolts, not shown, of the retainer 7 are made to pass through the flange section 9c, and the bolts are fastened with nuts, whereby the airbag 20 and the inflator 9 can be installed in the case 11. Furthermore, the case 11 is covered with the airbag cover 13, and the airbag cover 13 is installed on the case 11 using, for example, the rivets 14, and then the horn switch mechanism, not shown, is installed on the installation pieces 11c, whereby the airbag apparatus M can be assembled. The airbag apparatus M can be mounted on a vehicle V by installing the airbag apparatus M on the steering wheel body 1 having been fastened to the steering shaft SS in advance by using the installation board, not shown, of the horn switch mechanism.

After the airbag apparatus M is mounted on the vehicle, if the vehicle collides with a running vehicle, the inflator 9 operates so as to discharge the inflation gas from the gas discharge ports 9b, the inflation gas is made to enter the inside of the airbag 20 (the bag body 21) to inflate the airbag 20. The airbag 20 pushes open the door sections 13b and 13b of the airbag cover 13, protrudes from the case 11 and completes the inflation so as to cover the entire upper face side of the steering wheel W, as indicated by two-dot chain lines in FIGS. 1 and 2 and as shown in FIG. 7.

Moreover, in the airbag 20 for use in the airbag apparatus M according to this embodiment, since the regulating panel 50 serving as the regulating member for regulating the inflation-completed shape of the bag body 21 is disposed on the outer peripheral side of the bag body 21, the inflation gas entering the inside of the bag body 21 via the gas inflow port 23 enters the inside of the bag body 21 without being affected by the regulating panel 50, whereby the bag body 21 can be inflated smoothly and quickly by the inflation gas. What's more, the regulating panel 50 is configured so as to regulate the bag body 21 so that the area ranging from the vicinity of the joint portion 28 for mutually joining the outer peripheral edges 22a and 27a of the vehicle body side panel 22 and the occupant side panel 27 to the side of the gas inflow port 23 is made smaller in external dimensions and reduced in size than the area at the time of free inflation state of the bag body 21, hence, at the time of inflation completion of the airbag 20, the airbag 20 is regulated by the regulating panel 50, whereby the bag body 21 is bulkily inflated such that the occupant side panel 27 is separated from the gas inflow port 23 while the area in the vicinity of the gas inflow port 23 in the vehicle body side panel 22 is reduced in size. Consequently, the inflation-completed shape of the bag body 21 can be regulated accurately by the regulating panel 50, and the bag body 21 can be inflated quickly and thickly. However, in the case that the regulating panel is not provided, an airbag 20' is inflated as indicated by two-dot chain line in FIG. 7 such that the bag body of the airbag 20' becomes flatter and larger in the outside diameter than the bag body 21 of the airbag 20 according to this embodiment.

Hence, with the airbag 20 according to this embodiment, the airbag can be inflated smoothly and quickly, and the inflation-completed shape of the airbag can be is regulated more accurately by the regulating panel 50 serving as a regulating member.

Furthermore, with the airbag 20 according to this embodiment, the regulating panel 50 is configured as an annular member, the inner peripheral shape (the inner peripheral edge 50b) of which is set smaller than the joint portion 28 for mutually joining the outer peripheral edges 22a and 27a of the vehicle body side panel 22 and the occupant side panel 27. In this embodiment, the inside diameter d1 of the inner peripheral edge 50b (the opening area 51) of the regulating panel 50 is set smaller than the outside diameter of the joint portion 28, that is, the inside diameter d1 is set smaller than the outside diameter D1 of the bag body 21 in the flatly developed state. For this reason, in the vehicle body side panel 22, the area ranging from the vicinity of the joint portion 28 to the gas inflow port 23 can be regulated by the inner peripheral edge 50b of the regulating panel 50 so as to be reduced in size over the entire circumference. Hence, by the regulation of the regulating panel 50, the bag body 21 can be inflated such that the area around the gas inflow port 23 is reduced in size over the entire circumference, and the inflation-completed shape of the bag body 21 can be regulated more stably. However, if this point is not taken into consideration, it may be possible to use a regulating member being configured such that the area ranging from the vicinity of the joint portion to the side of the gas inflow port is made smaller in external dimensions and reduced in size than the area at the time of free inflation state by partially pinching the area.

Furthermore, in the airbag 20 according to this embodiment, the occupant side panel 27 and the vehicle body side panel 22 constituting the bag body 21 are configured so as to be formed into substantially circular shapes, their external shapes in the flatly developed state being made nearly identical. Moreover, the regulating panel 50 is configured so as to be made of a flexible sheet and formed into a circular annular shape so that the side of the outer peripheral edge 50a is joined to the occupant side panel 27 and so that the side of the inner peripheral edge 50b is positioned on the side of the vehicle body side panel 22 at the time of inflation completion of the bag body 21. Hence, in the airbag 20 according to this embodiment, the regulating panel 50 can be connected to the bag body 21 by simply joining the side of the outer peripheral edge 50a that is larger than the inner peripheral edge 50b in circumferential length to the occupant side panel 27, whereby the production of the airbag 20 is made easy.

What's more, in the airbag according to this embodiment, at the time of inflation completion of the airbag 20, the inflation-completed shape of the bag body 21 is regulated by the regulating panel 50 such that the area of the peripheral edge of the gas inflow port 23 in the vehicle body side panel 22 is formed into a flat face shape and such that the area (the curved portion 30a of the extended wall section 30) of the vehicle body side panel 22 located in the vicinity of the inner peripheral edge 50b and protruding from the inner peripheral edge 50b of the regulating panel 50 is inflated significantly and protruded toward the side of the case 11 serving as the storage portion. More specifically, at the time of inflation completion of the airbag 20, the regulating panel 50 made of a circular annular sheet is disposed such that the intermediate portion 50c between the outer peripheral edge 50a and the inner peripheral edge 50b is protruded outward (downward) by the bag body 21 that is inflated by the inflow of the inflation gas into the inside of the air bag and such that the cross-sectional shape is curved so as to be formed into a substantially circular arc shape, whereby the external shape of the bag body 21 is regulated by the regulating panel 50 such that the regulated wall section 29, the outer peripheral side of which is covered with the regulating panel 50, is formed along the curved state of the regulating panel 50 and the lower end 29a making contact with the inner peripheral edge 50b of the regulating panel 50 is dented (constricted) inward significantly. In addition, at the time, in the vehicle body side panel 22, the area on the inside (on the side of the gas inflow port 23) of the inner peripheral edge 50b of the regulating panel 50 protrudes outward (downward) so as to serve as the extended wall section 30. The extended wall section 30 is configured so as to have the curved portion 30a disposed so as to be curved and inflated on the side of the outer peripheral edge and the flat portion 30b (the area of the peripheral edge 24 of the gas inflow port 23) disposed in a substantially flat shape on the central side. Hence, in the bag body 21 having completed inflation, the extended wall section 30 protruding so as to extend from the regulating panel 50 protrudes toward the side of the ring section R so that no clearance occurs between the extended wall section 30 and the ring section R in the periphery of the case 11 serving as the storage portion, whereby the bag body 21 having completed inflation can be regulated so as not to significantly float from the ring section R in the periphery of the case 11 serving as the storage portion. In addition, since the extended wall section 30 of the bag body 21 is disposed close to the ring section R, the ring section R can be made to support the bag body 21 quickly and smoothly at the time of receiving an occupant, whereby the occupant can be restrained accurately by the bag body 21.

In particular, although the airbag 20 according to this embodiment is mounted on the steering wheel W having a small-diameter ring, the diameter D2 of the ring being set to approximately ⅗ of the outside diameter D1 of the bag body 21, the vehicle body side panel 22 can be suppressed accurately so as not to float from the ring section R of the steering wheel W at the time of inflation completion, whereby the airbag 20 is suitable for the steering wheel W having a small-diameter ring. However, if this point is not taken into consideration, it may be possible that, for example, a flexible cord member, instead of a sheet, is formed into an annular shape, the inside diameter of which is made smaller than the outside diameter of the joint portion of the bag body, and the cord member is disposed and used on the side of the vehicle body side panel at the time of inflation completion of the bag body.

Figure 6:
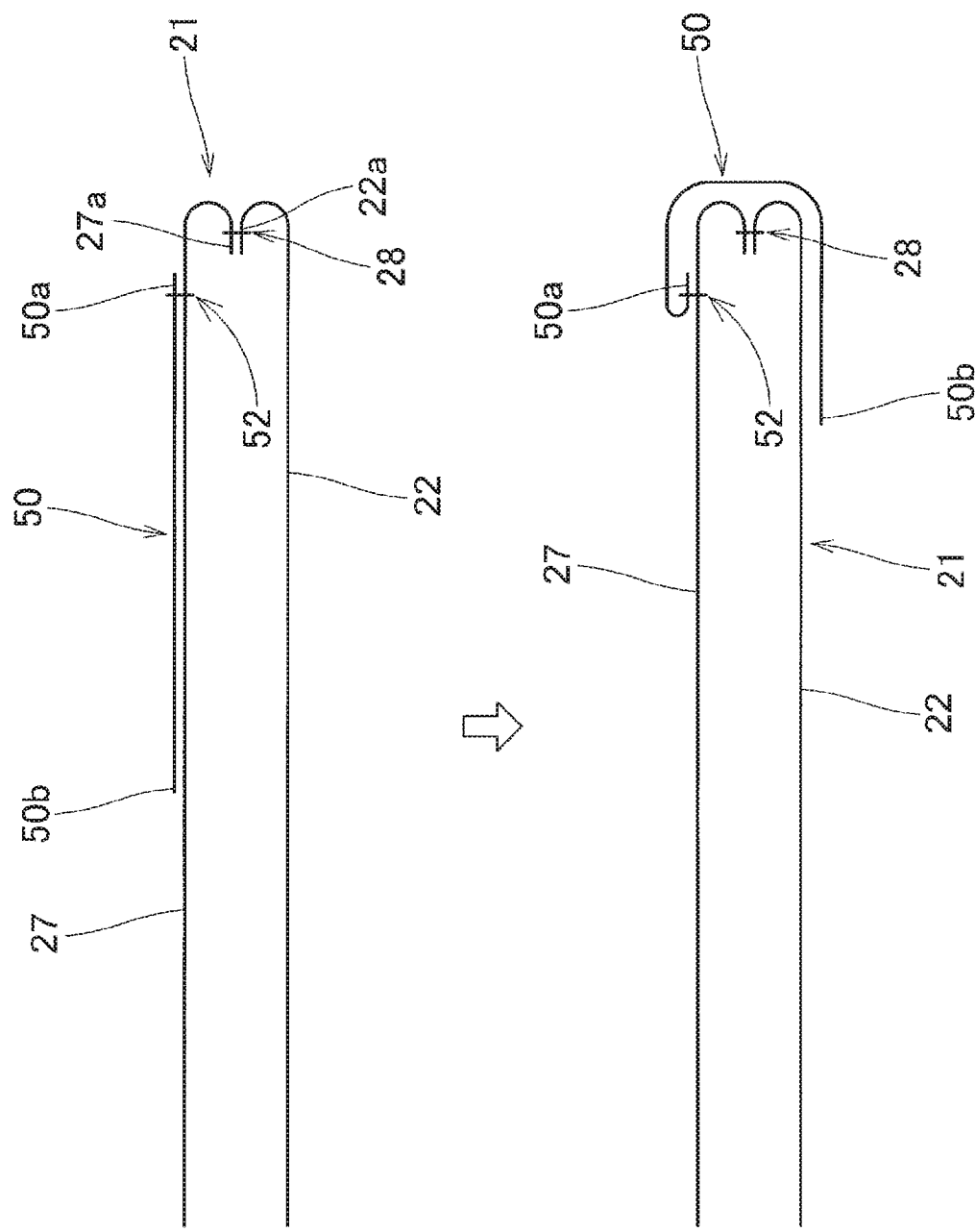
FIG. 6 is an enlarged sectional view illustrating the state in which a regulating panel is reversed at the time when the airbag shown in FIG. 3 is produced.

Furthermore, in the airbag 20 according to this embodiment, in the state in which the side of the outer peripheral edge 50a is directed to the side of the outer peripheral edge 27a of the occupant side panel 27 and the side of the inner peripheral edge 50b is directed to the central side of the occupant side panel 27, the regulating panel 50, the side of the outer peripheral edge of which is joined to the occupant side panel 27, is reversed so that the side of the inner peripheral edge 50b is disposed on the side of the vehicle body side panel 22, and then the airbag 20 is folded and stored in the case 11 serving as the storage portion. In other words, in the airbag 20 according to this embodiment, after the side of the outer peripheral edge 50a is joined to the occupant side panel 27, the regulating panel 50 is reversed, and the inner peripheral edge 50b is positioned on the side of the vehicle body side panel 22 as shown in FIG. 6. Hence, the side of the outer peripheral edge 50a of the regulating panel 50 can be joined (sewn) to the occupant side panel 27 over the entire circumference by simply placing the flatly developed regulating panel 50 on the flatly developed occupant side panel 27 and by performing flat sewing work (joining work). In comparison with a case in which the regulating member (the regulating panel 50) is not reversed, the joining work for joining the regulating panel 50 to the bag body 21 is made easy and the workability for folding the airbag 20 becomes excellent, whereby the airbag 20 can be produced easily. However, if this point is not taken into consideration, it may be possible that the regulating panel is configured such that the side of the outer peripheral edge is joined to the occupant side panel and the side of the inner peripheral edge is positioned on the side of the vehicle body side panel in the state in which the regulating panel is not reversed, whereby the regulating panel is disposed on the outer peripheral side of the bag body.

Moreover, the airbag 20 according to this embodiment is configured such that the tether 38 for connecting the area located around the center of the occupant side panel 27 to the peripheral edge 24 of the gas inflow port 23 in the vehicle body side panel 22 is disposed inside the bag body 21. Hence, even if the bag body 21 is bulkily inflated by virtue of the regulating panel 50, the bag body 21 can be prevented from being inflated to the extent that the occupant side panel 27 is excessively separated from the gas inflow port 23, and, at the same time, the occupant side panel 27 at the time of inflation completion can be formed into a substantially flat shape, whereby the occupant (driver) can be received smoothly by the wide flat area (the planned occupant-receiving section 27b) of the occupant side panel. What's more, by virtue of the tether 38, the flat portion 30b of the extended wall section 30 composed of the area of the peripheral edge 24 of the gas inflow port 23 can be disposed so as to be nearly parallel with the planned occupant-receiving section 27b, and the curved state formed in the area (the area in the vicinity of the inner peripheral edge 50b of the regulating panel 50, that is, the curved portion 30a of the extended wall section 30) around the flat portion 30b and protruding toward the case 11 can be maintained further accurately, whereby the bag body 21 having completed inflation can be regulated further accurately so as not to float significantly from the ring section R around the periphery of the case 11. However, if this point is not taken into consideration, the airbag may be configured such that the tether is not disposed inside.

In the airbag 20 according to this embodiment, the shape of the airbag 20 at the time of inflation completion can be adjusted by appropriately changing the external shape (the outside diameter D3 of the outer peripheral edge 50a and the inside diameter of the inner peripheral edge 50b) of the regulating panel 50 without changing the outside diameter of the bag body 21. For example, in the case that the outside diameter of the regulating panel is set further smaller than the outside diameter of the bag body, the airbag can be inflated so as to be further thicker in thickness while the outside diameter thereof is made smaller, conversely, in the case that the outside diameter of the regulating panel is set larger, the airbag can be inflated thinner in thickness while the outside diameter thereof is made larger. Still further, in the case that the inside diameter of the inner peripheral edge of the regulating panel is set so as to be large relative to the outside diameter of the outer peripheral edge (in the case that the regulating panel is made larger in width), the intermediate portion of the vehicle body side panel can be further constricted, and the airbag at the time of inflation completion can be inflated such that the height of the airbag from the steering wheel increases (the airbag becomes bulky), conversely, in the case that the inside diameter of the inner peripheral edge of the regulating panel is set smaller than the outside diameter of the outer peripheral edge (in the case that the regulating panel is made smaller in width), the amount of the constriction at the intermediate portion of the vehicle body side panel is decreased, whereby the airbag can be inflated such that the height of the airbag from the steering wheel decreases at the time of inflation completion. In this embodiment, the inner peripheral edge 50b of the regulating panel 50 is not joined to the side of the bag body 21. However, for example, in the case that the inside diameter of the inner peripheral edge of the regulating panel is set small relative to the outside diameter of the outer peripheral edge, the inner peripheral edge may be partially joined to the side of the bag body so that the inner peripheral edge is prevented from rolling upward at the time of development and inflation and so that the inner peripheral edge is made to securely cover the outer peripheral side of the joint portion at the time of inflation completion.

In this embodiment, the airbag for use in the airbag apparatus for the driver's seat to be mounted on the steering wheel is taken as an example and has been described. However, the airbag apparatus to which the airbag according to the present invention is applicable is not limited to be used for the driver's seat. The airbag according to the present invention may also be applied to an airbag apparatus for a front passenger's seat by mutually joining the outer peripheral edges of the vehicle body side panel and the occupant side panel of the bag body so as to form the bag body into a bag shape.

According to an aspect of the invention, there is provided an airbag including a vehicle body side panel that is disposed on a side of a vehicle body and an occupant side panel that is disposed on a side of an occupant at a time of inflation completion, the airbag configured such that an outer peripheral wall is formed by mutually joining an outer peripheral edge of the vehicle body side panel and an outer peripheral edge of the occupant side panel, inflation gas made to flow into the airbag from a gas inflow port formed in the vehicle body side panel so as to be able to inflate the airbag, the airbag folded and stored in a storage portion, a periphery of the gas inflow port installed on a side of the storage portion, the airbag comprising: a bag body forming the outer peripheral wall; and a regulating member disposed on an outer peripheral side of the bag body at a time of inflation completion of the bag body, wherein the regulating member is configured so as to be able to regulate the bag body so that an area ranging from the vicinity of a joint portion for mutually joining the outer peripheral edge of the vehicle body side panel and the outer peripheral edge of the occupant side panel to a side of the gas inflow port at the time of inflation completion of the airbag is made smaller in external dimensions and reduced in size than an area at a time of free inflation state of the bag body.

In the airbag according to the present invention, since the regulating member for regulating the inflation-completed shape of the bag body is disposed on the outer peripheral side of the bag body, the inflation gas to enter the inside of the bag body via the gas inflow port can enter the inside of the bag body without being affected by the regulating member, whereby the bag body can be inflated smoothly and quickly by the inflation gas. What's more, the regulating member is configured so as to regulate the bag body so that the area ranging from the vicinity of the joint portion for mutually joining the outer peripheral edges of the vehicle body side panel and the occupant side panel to the side of the gas inflow port is made smaller in external dimensions and reduced in size than the area at the time of free inflation state of the bag body. Hence, at the time of inflation completion of the airbag, the airbag is regulated by the regulating member, whereby the bag body is bulkily inflated such that the occupant side panel is separated from the gas inflow port while the area in the vicinity of the gas inflow port in the vehicle body side panel is reduced. Consequently, the inflation-completed shape of the bag body can be regulated accurately by the regulating member, and the bag body can be inflated quickly and thickly.

Hence, with the airbag according to the present invention, the airbag can be inflated smoothly and quickly, and the inflation-completed shape of the airbag can be regulated more accurately by the regulating member.

Furthermore, in the airbag according to the present invention, the regulating member is configured as an annular member, an inner peripheral shape of which is set smaller than the joint portion for mutually joining the outer peripheral edges of the vehicle body side panel and the occupant side panel. With this configuration, in the vehicle body side panel, the area ranging from the vicinity of the joint portion to the gas inflow port can be regulated by the inner peripheral side of the regulating member so as to be reduced in size over the entire circumference. Hence, by the regulation of the regulating member, the bag body can be inflated such that the area around the gas inflow port is reduced in size over the entire circumference, and the inflation-completed shape of the bag body can preferably be regulated more stably.

Furthermore, in the airbag configured as described above, it is preferable that the occupant side panel and the vehicle body side panel are configured so as to be formed into substantially circular shapes, their external shapes in flatly developed state of the airbag made nearly identical, and that the regulating member is configured so as to be made of a flexible sheet and formed into a circular annular shape so that a side of an outer peripheral edge is joined to the occupant side panel and so that a side of the inner peripheral edge is positioned on a side of the vehicle body side panel at the time of inflation completion of the bag body.

With this configuration of the airbag, the regulating member can be connected to the bag body by simply joining the side of the outer peripheral edge that is larger than the inner peripheral edge in circumferential length to the occupant side panel, whereby the production of the airbag is made easy. What's more, at the time of inflation completion of the airbag, the inflation-completed shape of the bag body is regulated by the regulating member such that the area of the peripheral edge of the gas inflow port in the vehicle body side panel is formed into a flat face shape and such that the area of the vehicle body side panel located in the vicinity of the inner peripheral edge and protruding from the inner peripheral edge of the regulating member is inflated significantly and protruded toward the side of the storage portion. Hence, in the bag body having completed inflation, the area in the vicinity of the inner peripheral edge of the vehicle body side panel protruding from the regulating member protrudes toward the side of the peripheral edge of the storage portion so that no clearance occurs between t the area and the peripheral edge of the storage portion, whereby the bag body having completed inflation can preferably be regulated so as not to significantly float from the peripheral edge of the storage portion.

More specifically, in a state in which the side of the outer peripheral edge of the regulating member is directed to a side of the outer peripheral edge of the occupant side panel and the side of the inner peripheral edge of the regulating member is directed to a central side of the occupant side panel, the regulating member, the side of the outer peripheral edge of which is joined to the occupant side panel, is reversed so that the side of the inner peripheral edge of the regulating member is disposed on the side of the vehicle body side panel, and then the airbag is folded and stored in the storage portion. In comparison with a case in which the regulating member is not reversed, the joining work for joining the regulating member to the bag body is made easy and the workability for folding the airbag becomes excellent, whereby the airbag can preferably be produced easily.

Moreover, in the airbag configured as described above, in the case of a configuration in which a tether for connecting an area located around a center of the occupant side panel to a peripheral edge portion of the gas inflow port in the vehicle body side panel is disposed inside the bag body, the bag body can be prevented from being inflated to the extent that the occupant side panel is excessively separated from the gas inflow port, and, at the same time, the occupant side panel at the time of inflation completion can be formed into a substantially flat shape, whereby the occupant can be received smoothly by the wide flat area of the occupant side panel. What's more, at the time of inflation completion, by virtue of the tether, the flat state of the area of the peripheral edge of the gas inflow port and the protruding state of the area (the area in the vicinity of the inner peripheral edge of the regulating member) around the area toward the side of the storage portion can be maintained more accurately, whereby the bag body having completed inflation can preferably be regulated further accurately so as to be prevented from floating significantly from the peripheral edge of the storage portion.

What is claimed is:

1. An airbag including a vehicle body side panel that is disposed on a side of a vehicle body and an occupant side panel that is disposed on a side of an occupant at a time of inflation completion of the airbag, the airbag configured such that an outer peripheral wall is formed by mutually joining an outer peripheral edge of the vehicle body side panel and an outer peripheral edge of the occupant side panel, inflation gas made to flow into the airbag from a gas inflow port formed in the vehicle body side panel so as to be able to inflate the airbag, the airbag folded and stored in a storage portion, a periphery of the gas inflow port installed on a side of the storage portion, the airbag comprising:

a bag body forming the outer peripheral wall; and a regulating member disposed on an outer peripheral side of the bag body at a time of inflation completion of the bag body, wherein the regulating member is configured so as to be able to regulate the bag body so that an area ranging from the vicinity of a joint portion for mutually joining the outer peripheral edge of the vehicle body side panel and the outer peripheral edge of the occupant side panel to a side of the gas inflow port at the time of inflation completion of the airbag is made smaller in external dimensions and reduced in size than an area at a time of free inflation state of the bag body.

2. The airbag according to claim 1, wherein the regulating member is configured from an annular member, an inner peripheral shape of which is set smaller than the joint portion for mutually joining the outer peripheral edge of the vehicle body side panel and the outer peripheral edge of the occupant side panel.

3. The airbag according to claim 2, wherein the occupant side panel and the vehicle body side panel are configured so as to be formed into substantially circular shapes, the external shapes thereof in flatly developed state of the airbag made nearly identical, and the regulating member is configured so as to be made of a flexible sheet and formed into a circular annular shape so that a side of an outer peripheral edge is joined to the occupant side panel and so that a side of an inner peripheral edge is positioned on a side of the vehicle body side panel at the time of inflation completion of the bag body.

4. The airbag according to claim 3, wherein, in a state in which the side of the outer peripheral edge of the regulating member is directed to a side of the outer peripheral edge of the occupant side panel and the side of the inner peripheral edge of the regulating member is directed to a central side of the occupant side panel, the regulating member, the side of the outer peripheral edge of which is joined to the occupant side panel, is reversed so that the side of the inner peripheral edge of the regulating member is disposed on the side of the vehicle body side panel, and then the airbag is folded and stored in the storage portion.

5. The airbag according to claim 1, wherein a tether for connecting an area located around a center of the occupant side panel to a peripheral edge portion of the gas inflow port in the vehicle body side panel is disposed inside the bag body.

* * * * *